United States Patent

Masukawa et al.

(10) Patent No.: US 7,947,103 B2
(45) Date of Patent: May 24, 2011

(54) HONEYCOMB STRUCTURE AND METHOD FOR PRODUCING SAME

(75) Inventors: Naoshi Masukawa, Kitanagoya (JP); Atsushi Watanabe, Nagoya (JP); Shuichi Ichikawa, Handa (JP)

(73) Assignee: MGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/235,312

(22) Filed: Sep. 22, 2008

(65) Prior Publication Data

US 2009/0029105 A1   Jan. 29, 2009

Related U.S. Application Data

(63) Continuation of application No. PCT/JP2007/052786, filed on Feb. 15, 2007.

(30) Foreign Application Priority Data

Mar. 28, 2006   (JP) .................. 2006-087263

(51) Int. Cl.
*B01D 39/14* (2006.01)
*B01D 39/06* (2006.01)
*B32B 3/12* (2006.01)

(52) U.S. Cl. .............. 55/524; 55/523; 428/116
(58) Field of Classification Search .......... None
See application file for complete search history.

(56) References Cited

U.S. PATENT DOCUMENTS

| 4,304,585 | A | * | 12/1981 | Oda et al. ................ 65/43 |
| 2004/0097370 | A1 | * | 5/2004 | Ichikawa et al. ........... 502/439 |
| 2005/0050845 | A1 | * | 3/2005 | Masukawa et al. ......... 52/782.1 |
| 2006/0254713 | A1 | | 11/2006 | Fujita et al. |

FOREIGN PATENT DOCUMENTS

| EP | 1 270 202 A2 | 1/2003 |
| EP | 1 600 433 A1 | 11/2005 |
| EP | 1 618 941 A1 | 1/2006 |
| EP | 1 964 823 A1 | 9/2008 |
| JP | A 59-137374 | 8/1984 |
| JP | A-3-192176 | 8/1991 |
| JP | A 7-267746 | 10/1995 |
| JP | A 9-40476 | 2/1997 |
| JP | B2 2777707 | 7/1998 |
| JP | A 2000-7455 | 1/2000 |
| JP | A 2000-103687 | 4/2000 |
| JP | A 2004-262670 | 9/2004 |

OTHER PUBLICATIONS

Extended European Search Report issued Mar. 23, 2010 in EP 07 71 4316.

* cited by examiner

*Primary Examiner* — Gordon R Baldwin
(74) *Attorney, Agent, or Firm* — Oliff & Berridge, PLC

(57) ABSTRACT

Disclosed is a honeycomb structure which is bonded with a bonding material containing 0.1 to 10 mass % of a layered clay mineral. Also disclosed are a honeycomb structure which is bonded with a bonding material containing 0.1 to 10 mass % of an organic binder, and a honeycomb structure which is bonded with a bonding material having a Casson yield value of 6 Pa or more. Further disclosed is a method for producing such a honeycomb structure.

12 Claims, 3 Drawing Sheets

HONEYCOMB STRUCTURE AND METHOD FOR PRODUCING SAME

TECHNICAL FIELD

The present invention relates to a honeycomb structure and a method for producing the honeycomb structure. More particularly, the present invention relates to a honeycomb structure preferably usable as a catalyst carrier for an internal combustion engine, a boiler, a chemical reaction device, a reformer for a fuel cell and the like in which a catalyst function is used, or as a trapping filter for fine particles in an exhaust gas, and the like, and to a method for producing the honeycomb structure. More particularly, the present invention relates to a honeycomb structure having a large size, for example, but in which a plurality of honeycomb segments are securely bonded to one another, and it also relates to a method for producing the honeycomb structure.

BACKGROUND ART

A honeycomb structure made of a ceramics has been used as a catalyst carrier for an internal combustion engine, a boiler, a chemical reaction device, a reformer for a fuel cell and the like in which a catalyst function is used, a trapping filter (hereinafter referred to as a "diesel particulate filter (DPF)") for fine particles in an exhaust gas, particularly diesel fine particles, and the like.

This type of ceramic honeycomb structure is constituted so that a plurality of porous honeycomb segments having a large number of through holes which are separated by partition walls and which extend through the structure in an axial direction are bound via adhesive layers (for example, see Patent Document 1). That is, the ceramic honeycomb structure is constituted so that a plurality of rows of the porous honeycomb segments having a square pole shape are combined and bonded to one another via the adhesive layers. At this time, the bonding is performed by interposing the adhesive layer between the bonding faces of the porous honeycomb segments and then imparting vibration to the honeycomb segments while applying a pressing force to the segments. That is, in a bonding step, first, a first porous honeycomb segment including an underlayer formed on the bonding face is disposed in the lowermost portion of the cut part of a support jig. Subsequently, a second porous honeycomb segment including an underlayer which is formed on one bonding face and which is coated with an adhesive is brought into close contact with the first honeycomb segment so that the bonding faces of the segments face each other via the adhesive. In this case, the end faces of the two honeycomb segments are pressed with a pressing plate and positioned in advance. Then, a pressing jig is allowed to abut on the subsequent honeycomb segment, thereby pressing the segment in a vertical direction, and the vibration is imparted in a direction in which the bonding faces are displaced from each other. In consequence, the first and second honeycomb segments can be bonded.

Subsequently, a third porous honeycomb segment including an underlayer which is formed on one bonding face and which is coated with an adhesive is brought into close contact with the first honeycomb segment so that the bonding face of the third porous honeycomb segment faces the other bonding face of the first honeycomb segment via the adhesive. In this state, the third honeycomb segment can be bonded to the first honeycomb segment in the same manner as in the second honeycomb segment. Furthermore, a fourth porous honeycomb segment including underlayers which are formed on two bonding faces and which are coated with an adhesive is arranged to come in close contact with the second honeycomb segment and the third honeycomb segment. In this state, the fourth honeycomb segment can be bonded to the second honeycomb segment and the third honeycomb segment in the same manner as in the second and third honeycomb segments.

However, in the conventional bonding method, the pressure and vibration are applied to each porous honeycomb segment, whereby the segments are successively bonded. Therefore, the vibration and pressurizing force are transmitted to the lower segment having an early stacking order until the last honeycomb segment is completely bonded. This transmitted force acts as a peeling force with respect to the honeycomb segments bonded to each other, which results in a problem that the adhesive layer bonded to the lower honeycomb segment peels and that a bonding strength partially decreases.

To solve such a problem, a method for bonding a ceramic honeycomb structure is suggested in which for a purpose of maintaining, as they are stacked, the adhesive layers bonded to the respective honeycomb segments regardless of the stacking order of the respective porous honeycomb segments and bonding all the honeycomb segments uniformly with a desired bonding strength, a plurality of porous honeycomb segments having a large number of through holes which are separated by the partition walls and which extend through the structure in the axial direction are bound via the adhesive layers to constitute the structure. The method for bonding the ceramic honeycomb structure is characterized in that the respective porous honeycomb segments are stacked with the adhesive layers interposed between the bonding faces of the respective segments. After the predetermined number of the porous honeycomb segments are stacked, the whole structure is simultaneously and finally pressurized via the porous honeycomb segment positioned in the outermost peripheral layer, and thereby the porous honeycomb segments are bonded (for example, see Patent Document 2).

However, in both the cases, a load is applied to flatten out a bonding material, so that the bonding material requires fluidity. Therefore, from a bonding time to a time when bonded portions develop strength (to a time when heat is applied in both the cases), there is a disadvantage such as the nonuniformity of a bonding width due to the contraction of the bonding material or the displacement of the bonded portions. The nonuniformity of the bonding width or the displacement of the bonded portions causes stress concentration during actual use, which generates a disadvantage such as cracking. The durability of the honeycomb structure might lower.

Patent Document 1: JP-A-2000-7455
Patent Document 2: JP-A-2004-262670

DISCLOSURE OF THE INVENTION

The present invention has been developed in view of the problem of such a conventional technology, and an object thereof is to provide a honeycomb structure in which a plurality of honeycomb segments are securely bonded to one another without generating any bonding defect such as crack or displacement in these bonded portions of the segments, and a method for producing the honeycomb structure having such characteristics.

[1] A honeycomb structure comprising a plurality of honeycomb segments and being made of ceramic; said honeycomb segments being provided with cell structures comprising a plurality of cells constituting fluid channels divided by porous partition walls and porous outer walls on outer peripheries of the cell structures, and having been integrated by bonding the outer walls of the respective honeycomb segments to one another with a bonding material, wherein the bonding material contains 0.1 to 10 mass % of a layered clay mineral.

[2] The honeycomb structure according to the above [1], wherein the bonding material contains 0.1 to 10 mass % of an organic binder.

[3] The honeycomb structure according to the above [1] or [2], wherein the bonding material has a Casson yield value of 6 Pa or more.

[4] The honeycomb structure according to any one of the above [1] to [3], wherein the bonding material has a dimensionless hysteresis area (A−B)/(A+B) of 0.01 to 0.3, in which A is an area in a raising process, and B is an area in a lowering process, in a case where a shear speed is raised and lowered in a stepwise manner.

[5] The honeycomb structure according to any one of the above [1] to [4], wherein the bonding material has a contraction ratio of 3% or less, when the bonding material is left at room temperature.

[6] The honeycomb structure according to any one of the above [1] to [5], wherein the bonding material contains one selected from the group consisting of an inorganic binder, a ceramic aggregate, and a ceramic fiber.

[7] A method for producing a honeycomb structure made of a ceramics, comprising a bonding step of integrating a plurality of honeycomb segments, by bonding the outer walls of the respective honeycomb segments to one another with a bonding material; said honeycomb segments being provided with cell structures comprising a plurality of cells constituting fluid channels divided by porous partition walls and porous outer walls on outer peripheries of the cell structures, wherein a load is applied to the honeycomb segments to bond the outer walls by use of the bonding material containing 0.1 to 10 mass % of a layered clay mineral.

[8] The method for producing the honeycomb structure according to the above [7], wherein the bonding material contains 0.1 to 10 mass % of an organic binder.

[9] The method for producing the honeycomb structure according to the above [7] or [8], wherein the bonding material has a Casson yield value of 6 Pa or more.

[10] The method for producing the honeycomb structure according to any one of the above [7] to [9], wherein the bonding material has a dimensionless hysteresis area (A−B)/(A+B) of 0.01 to 0.3, in which A is an area in a raising process, and B is an area in a lowering process, in a case where a shear speed is raised and lowered in a stepwise manner.

[11] The method for producing the honeycomb structure according to any one of the above [7] to [10], wherein the bonding material has a contraction ratio of 3% or less, when the bonding material is left at room temperature.

[12] The method for producing the honeycomb structure according to any one of the above [7] to [11], wherein the bonding material contains one selected from the group consisting of an inorganic binder, a ceramic aggregate, and a ceramic fiber.

[13] The method for producing the honeycomb structure according to any one of the above [7] to [12], wherein the outer walls of the respective honeycomb segments are bonded while being applied with vibration.

[14] The method for producing the honeycomb structure according to any one of the above [7] to [13], wherein the honeycomb segments are bonded by giving a pressure to the outermost peripheral layer of the stacked honeycomb segments.

[15] The method for producing the honeycomb structure according to any one of the above [7] to [14], wherein a gap between the honeycomb segments is filled with the bonding material to bond the honeycomb segments.

According to the present invention, there can be obtained a honeycomb structure in which bonding width fluctuation or bonding displacement can be suppressed and in which a plurality of honeycomb segments are securely bonded to one another without generating any bonding defect such as crack or peel in the bonded portions of these segments, and there can be obtained a method for producing the honeycomb structure having such characteristics.

DESCRIPTION OF REFERENCE NUMERALS

1: honeycomb structure, 2: partition wall, 3: cell, 5: cell structure, 7: outer wall, 8: bonding layer, 12: honeycomb segment, 36: bonded body, 42: diamond tool, 43: coating material, 44: smoothing plate, 45: shaft, 46: handle, 47: pressing jig, 48: outer periphery coater, 50: outer peripheral wall.

BEST MODE FOR CARRYING OUT THE INVENTION

An embodiment of the present invention will hereinafter be described, but it should be understood that the present invention is not limited to the following embodiment, and the scope of the present invention includes the present invention appropriately subjected to design change, improvement and the like based on the ordinary knowledge of any one skilled in the art within the scope of the present invention.

Figure 1A:
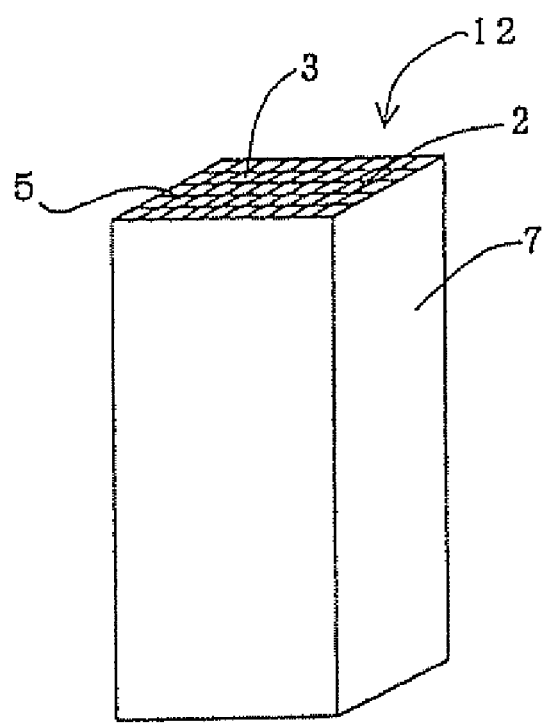
FIG. 1(a) is a diagram showing one embodiment of a honeycomb structure according to the present invention, and is a perspective view showing a honeycomb segment.
Figure 1B:
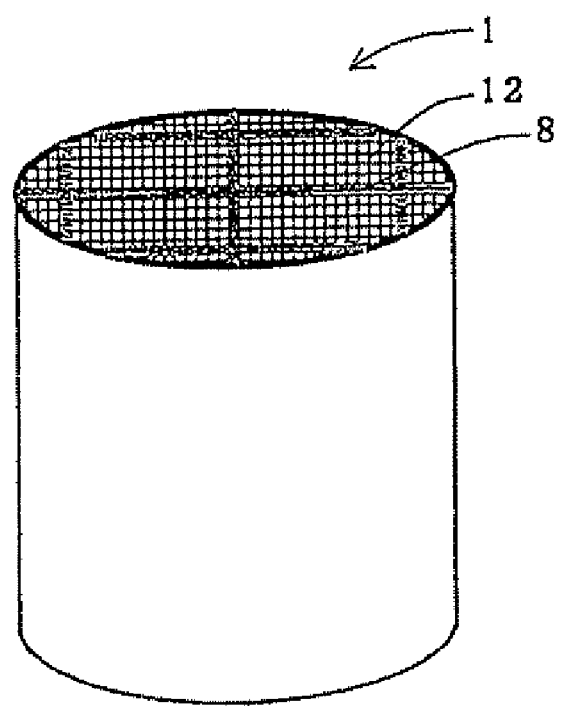
FIG. 1(b) is a diagram showing one embodiment of the honeycomb structure according to the present invention, and is a perspective view showing the honeycomb structure.
Figure 1C:
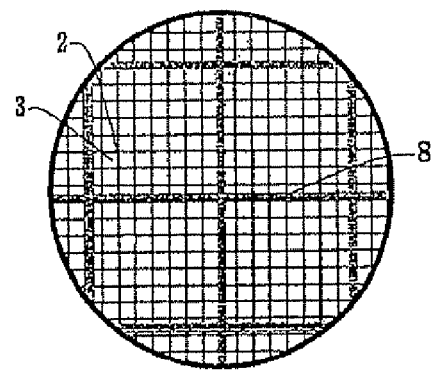
FIG. 1(c) is a diagram showing one embodiment of the honeycomb structure according to the present invention, and is a top plan view showing the honeycomb structure.

FIG. 1 show diagrams of one embodiment of a honeycomb structure according to the present invention, FIG. 1(a) is a perspective view showing a honeycomb segment, FIG. 1(b) is a perspective view showing the honeycomb structure, and FIG. 1(c) is a top plan view showing the honeycomb structure. In a honeycomb structure 1 of the present embodiment, a plurality of honeycomb segments 12, provided with cell structures 5 comprising a plurality of cells 3 constituting fluid channels divided by porous partition walls 2 and porous outer walls 7 on outer peripheries of the cell structures 5, and having been integrated by bonding the outer walls 7 of the honeycomb segments 12 to one another with a bonding material 8.

A clay is usually defined as a particulate natural material having viscosity and plasticity when containing an appropriate amount of water. The clay is mainly constituted of a hydrous silicate mineral having an orderly layered structure whose large part includes crystals and which is basically in the same manner as in mica or the like in a rock. The main chemical components of the clay are silicate, alumina and water. In addition, the clay may contain Fe, Mg, Ca, Na, K or the like. A layered clay mineral broadly included as a particulate mineral in the clay is classified into three types of a kaolin mineral, a mica clay mineral, and smectite (montmorillonite) and a type referred to as a mixed layer mineral.

The kaolin mineral generally includes four minerals of kaolinite, dickite, nacrite, and halloysite. Kaolinite as a main component is constituted of silica, alumina, and water. When kaolinite is fired at 800° C. or more, recrystallization occurs, and kaolinite changes into mullite and silica. Examples of the mica type clay mineral include illite, glauconite, celadonite, sericite, and white mica. Examples of smectite include montmorillonite, beidellite, nontronite, saponite, and hectonite.

The present invention provides a honeycomb structure bonded with a bonding material containing 0.1 to 10 mass % of a layered clay mineral. In a case where the honeycomb segments are bonded with the bonding material containing 0.1 to 10 mass % of the layered clay mineral, after the honeycomb segments are pressurized and bonded, the layered clay mineral having a swollen state is oriented. In consequence, the movement of the clay particles is suppressed, whereby a bonding force between the bonding material and the surfaces of the honeycomb segments is strengthened, and the bonded portions where any positional deviation is not caused are formed.

In the present invention, the above-illustrated layered clay mineral can be used in accordance with a purpose. A fluidity suppressing effect largely depends on the swelling ability of the layered clay mineral, so that montmorillonite, beidellite, nontronite, hectonite, vermiculite or the like are especially preferable. The amount of such a layered clay mineral contained in the bonding material is preferably 0.1 to 10 mass %, especially preferably 0.5 to 7 mass %.

Further in the present invention, the honeycomb structure is bonded with the bonding material containing 0.1 to 10 mass % of an organic binder. The layered clay mineral suppresses the fluidity of the bonding material, whereas the organic binder has a property of imparting the fluidity to the bonding material. When the honeycomb segments are bonded using the bonding material containing 0.1 to 10 mass % of the organic binder, the fluidity in a case where a strong load is applied can be secured, and the bonding force between the material and the honeycomb segment surfaces can be strengthened as well, whereby there is an effect that the bonded portions where any positional deviation is not generated can be obtained.

The organic binder is generally an organic bonding agent, and the bonding agent is a material for use in bonding or fixing homogeneous or heterogeneous solids to form a material, a product or the like. When a ceramic material is manufactured, the organic binder is any type of organic compound to be added so that ceramic material powder can be formed to apply a strength required for maintaining the shape of the powder. Therefore, typical examples of the organic binder include naturally derived starch, gelatin, agar, semi-synthesized alkyl cellulose (for example, methyl cellulose), a cellulose derivative such as carboxymethyl cellulose, and a synthetic water-soluble polymer such as polyvinyl alcohol, polyacrylic polymer, polyacryl amide, a polyethylene oxide or the like. In the present invention, it is preferable to use an organic binder such as carboxymethyl cellulose, methyl cellulose, hydroxypropyl methyl cellulose, or polyvinyl alcohol.

The amount of the organic binder contained in the bonding material is preferably 0.1 to 10 mass %. It is more preferable to contain 0.1 to 10 mass % of the binder. It is possible to obtain an effect that the bonded portions of the honeycomb segments do not cause any positional deviation.

In the present invention, the honeycomb structure is bonded with the bonding material having a Casson yield value of 6 Pa or more. The Casson yield value is an index indicating a pressure required for imparting the fluidity to the bonding material. When its numeric value is 6 Pa or more, the bonding material does not easily flow. Therefore, if no strong load is applied, each honeycomb segment becomes immobile. That is, there is obtained the honeycomb structure having the bonded portions where any positional deviation is not caused.

In the present invention, the honeycomb structure is bonded with the bonding material having a dimensionless hysteresis area $(A-B)/(A+B)$ of 0.01 to 0.3, in which A is an area in a raising process, and B is an area in a lowering process, in a case where a shear speed is raised and lowered in a stepwise manner. When the value of $(A-B)/(A+B)$ measured in conformity to JIS R1665 is small, the structure of the bonding material quickly recovers. That is, it is indicated that after the slurry of the bonding material once has fluidity, the fluidity is lost in a short time. The honeycomb structure is bonded using a slurry having a value of 0.3 or less, whereby the bonding material easily loses the fluidity, and the bonded portions where any positional deviation is not caused are obtained.

In the present invention, the honeycomb structure is bonded with the bonding material having a contraction ratio of 3% or less, when the bonding material is left at room temperature. When the contraction ratio of the bonding material is 3% or less, the bonding material has only small fluidity. That is, the honeycomb structure is bonded using the bonding material having a contraction ratio of 3% or less, whereby the bonded portions where any positional deviation or peel is not caused are obtained. As a method for measuring the contraction ratio of the bonding material, a water-repellent cup having a diameter of 100 mm and a height of 20 mm is filled with the bonding material slurry, and left at 25° C. for 48 hours. Afterward, the diameter and height of the resultant dried body are measured to obtain the contraction ratio.

In the present invention, the honeycomb structure is bonded with the bonding material containing one selected from the group consisting of an inorganic binder, a ceramic aggregate, and a ceramic fiber. In the inorganic binder of the present invention, a colloidal oxide is preferably used. Examples of the inorganic binder include silica sol, alumina sol, colloidal silica, and colloidal alumina. These materials may be used alone or as a combination of two or more types thereof. Especially preferable examples of the inorganic binder include silica sol and alumina sol. Examples of ceramic aggregate include a ceramics selected from the group consisting of silicon carbide (SiC), silicon nitride (SiNx), cordierite, alumina, mullite, zirconia, zirconium phosphate, aluminum titanate, titania, and a combination thereof, an Fe—Cr—Al-based metal, a nickel-based metal, and a metal silicon (Si)-silicon carbide (SiC) composite material. Examples of the ceramic fiber include mullite, aluminosilicate, alumina, an $SiO_2$—MgO-based fiber, and an $SiO_2$—CaO—MgO-based fiber.

Further in the present invention, there is provided a method for producing the honeycomb structure in which a load is applied to the honeycomb segments to bond the segments by use of the above bonding material. Moreover, there is provided the method for producing the honeycomb structure in which the honeycomb segments are bonded using the above bonding material while being applied with vibration. Furthermore, there is provided the method for producing the honeycomb structure in which the above bonding material is used and in which the honeycomb segments stacked in an outermost layer is pressurized to apply a pressurizing force to the whole structure. In addition, there is provided the method for producing the honeycomb structure in which the above bonding material is used and in which a gap between the honeycomb segments is arranged with a predetermined gap made therebetween is filled with the bonding material.

The honeycomb structure of the present invention is produced by bonding the honeycomb segments with the bonding material. To produce the honeycomb segments, for example, a binder such as methyl cellulose or hydroxymethyl cellulose, a surfactant, water and the like are added to a raw material such as silicon carbide, silicon carbide powder and metal silicon powder for forming a silicon carbide-metal silicon composite, and other ceramic material. This material is kneaded to form a plastic clay. Subsequently, the resultant clay is extruded and formed in a forming step, to form a honeycomb formed body having a plurality of cells constituting fluid channels divided by partition walls. For the extrusion forming, a plunger type extruder, a biaxial screw type continuous extruder or the like may be used. When the biaxial screw type continuous extruder is used, a clay-forming step and a forming step can continuously be performed. The resultant honeycomb formed body can be dried by, for example, microwaves, dielectric heating and/or hot air, and then fired to obtain a honeycomb fired body.

In the present invention, there is not any special restriction on the cell density (the number of the cells per unit sectional area crossing the channel at right angles) of the honeycomb segment. However, when the cell density is excessively small, it is unfavorable because a geometric surface area runs short. When the cell density is excessively large, it is unfavorable because a pressure loss excessively increases. The cell density is preferably 0.9 to 310 cells/cm$^2$ (6 to 2000 cells/square inch). Moreover, there is not any special restriction on the shape of a cell section (a section crossing the channel at right angles), and there may be used a polygonal shape such as a triangular shape, a quadrangular shape, or a hexagonal shape, a circular shape, an elliptic shape, or any shape such as a corrugated shape. From a viewpoint of manufacturing, however, the triangular shape, the quadrangular shape, or the hexagonal shape is preferable. Moreover, there is not any special restriction on the thickness of the partition wall. However, when the partition wall is excessively thin, it is unfavorable because the strength of the honeycomb segment becomes insufficient. When the partition wall is excessively thick, it is unfavorable because the pressure loss excessively increases. The thickness of the partition wall is preferably in a range of 50 to 2000 μm.

Moreover, there is not any special restriction on the shape of the honeycomb segment, and any shape may be used. For example, a square pole shown in FIG. 1(a) is a basic shape, and a plurality of square poles are bonded and integrated as shown in FIG. 1b). It is also preferable that the shape of the honeycomb segments 12 constituting the outermost peripheral surface of the honeycomb structure 1 is matched with the outer peripheral shape of the honeycomb structure 1. Furthermore, the shape of the section of each honeycomb segment crossing the channel at right angles may be a fan shape.

Furthermore, there is not any special restriction on the shape of the section of the honeycomb structure crossing the channel at right angles, and there may be used a circular shape such as a perfect circular shape, an elliptic shape, or an oblong shape, a polygonal shape such as a triangular shape, a quadrangular shape, or a pentangular shape, or any shape such as an amorphous shape. In addition, when the honeycomb structure of the present invention is used as the catalyst carrier to be incorporated in an internal combustion engine, a boiler, a chemical reaction device, a reformer for a fuel cell or the like, the honeycomb structure preferably carries a metal having a catalyst capability. Typical examples of the metal having the catalyst capability include platinum (Pt), palladium (Pd) and rhodium (Rd). At least one of these metals is preferably carried by the honeycomb structure.

On the other hand, when the honeycomb structure of the present invention is used as a filter such as the DPF for trapping and removing a particulate matter (soot) contained in an exhaust gas, the openings of predetermined cells are plugged in one end face, and the openings of the remaining cells are plugged in the other end face. It is also preferable that adjacent-cells are plugged alternatively on the opposite end portions so that the end faces have a checkered pattern. The cells are plugged in this manner, whereby the soot-containing exhaust gas which has flowed into the one end face side of the honeycomb structure passes through the partition walls, and is discharged from the other end face side. When the exhaust gas passes through the partition walls, the porous partition walls function as a filter to trap the soot. It is to be noted that when the trapped soot is deposited on the partition walls, the pressure loss increases, so that a burden is imposed on the engine, and a fuel efficiency and drivability lower. Therefore, the soot is periodically burnt and removed by heating means such as a heater to regenerate the filter function. To promote the burning during this regeneration, the honeycomb structure may carry the above metal having the catalyst capability.

Figure 2A:
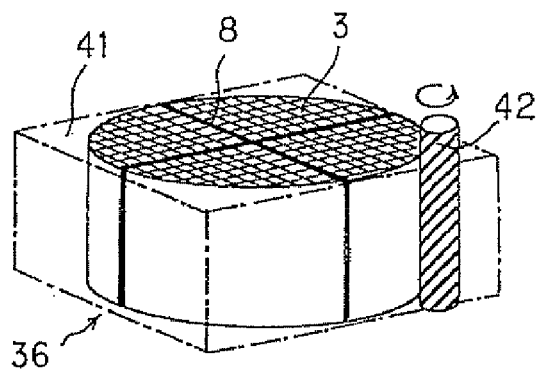
FIG. 2(a) is an explanatory view schematically showing one embodiment of a method for producing the honeycomb structure according to the present invention.

It is to be noted that at least a part of the outer periphery of the honeycomb structure (a bonded body) formed by bonding the honeycomb segments to one another may be removed, if necessary. Specifically, as shown in FIG. 2(a), for example, preferably 2 or more cells 3, further preferably 2 to 4 cells 3 are removed from the outermost periphery. Here, to remove the cells is to remove at least a part of the partition walls forming the cells to obtain a state in which four peripheries are completely not surrounded with the partition walls. During the removal, for example, the outer periphery of a bonded body 36 can be ground using grinding means such as a diamond tool 42 to remove a removal portion 41 including a plurality of cells 3.

Figure 2B:
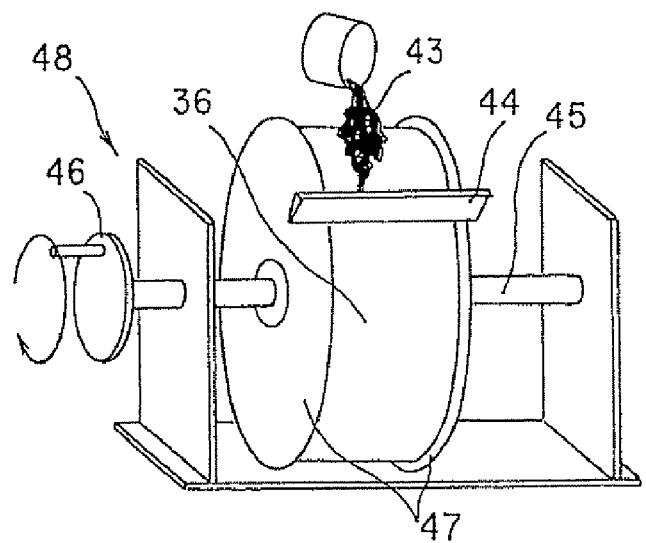
FIG. 2(b) is an explanatory view schematically showing one embodiment of the method for producing the honeycomb structure according to the present invention.
Figure 2C:
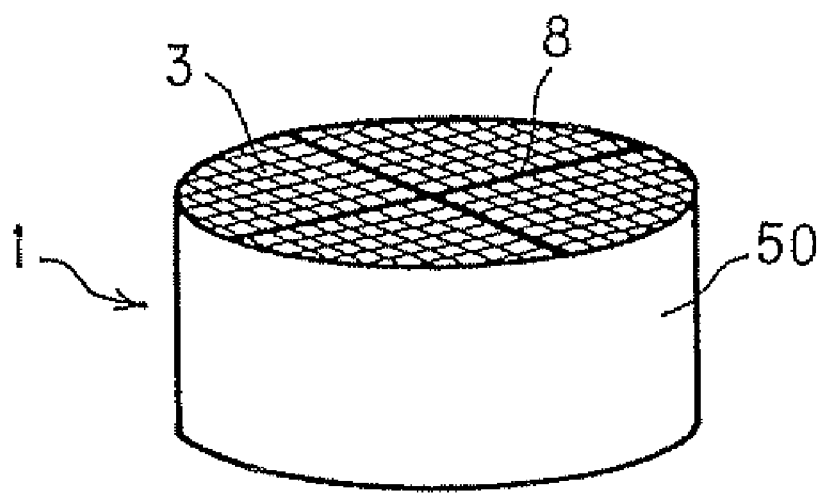
FIG. 2(c) is an explanatory view schematically showing one embodiment of the method for producing the honeycomb structure according to the present invention.

When at least a part of the outer periphery of the bonded body 36 is removed, as shown in FIGS. 2(b), 2(c), the corresponding portion is coated with a coating material 43 to form an outer peripheral wall 50 of the honeycomb structure 1. The coating material 43 preferably contains at least one selected from the group consisting of colloidal silica, colloidal alumina, a ceramic fiber, and ceramic particles. Examples of the ceramic particles include the particles of silicon carbide.

To apply the coating material, an outer periphery coater 48 shown in FIG. 2(b) is used, whereby the outer peripheral wall having a uniform wall thickness can be formed. Specifically, both end faces of the bonded body 36 having a part of the outer periphery removed are masked with pressing jigs 47 made of nylon, vinyl chloride or the like, and the bonded body 36 is held and fixed around a shaft 45 whose one end is provided with a rotating handle 46. Subsequently, the handle 46 is rotated, and the outer periphery of the bonded body 36 can uniformly be coated with the coating material 43 by use of a smoothing plate 44. It is to be noted that the thickness of the formed outer peripheral wall can be set by appropriately adjusting the size of the pressing jigs 47 with respect to the size of the bonded body 36.

EXAMPLES

The present invention will hereinafter be described in accordance with examples in more detail, but the present invention is not limited to these examples.

1. Manufacturing of Honeycomb Segment

As a honeycomb segment raw material, silicon carbide powder and silicon powder were mixed at a mass ratio of 80:20, and starch and a foam resin as pore formers, further methyl cellulose, hydroxypropoxyl methyl cellulose, a surfactant, and water were added to the material to prepare a plastic clay. This clay was extruded, formed, and dried by microwaves and hot air to obtain a honeycomb segment formed body having a partition wall thickness of 310 μm, a cell density of about 46.5 cells/cm$^2$ (300 cells/square inch), a square section with each 35 mm long side, and a length of 152 mm. In this honeycomb segment formed body, both end faces of the cells were plugged so that the end faces of the segment had a checkered pattern. That is, the cells were plugged so that the adjacent cells were plugged alternatively on the opposite end portions. As a plugging material, a material similar to the honeycomb segment raw material was used. Both the end faces of the cells were plugged, dried, then degreased in an atmosphere at about 400° C. and then fired in an Ar inactive atmosphere at about 1450° C. to obtain the honeycomb segment having a porous structure in which SiC crystal particles were bonded with Si.

2. Preparation and Characteristics of Bonding Material

On the other hand, SiC powder as inorganic particles, an aqueous solution containing 40 mass % of silica gel as an inorganic binder, and an aluminosilicate fiber as a ceramic fiber were added at a mass ratio of 40:30:30. Furthermore, montmorillonite as a layered clay mineral and polyvinyl alcohol as an organic binder were mixed at a mass ratio shown in Table 1. Water was added to the resultant mixture, and the mixture was kneaded using a mixer for 30 minutes to obtain bonding materials A to F having a composition shown in Table 1. The slurry characteristics of the resultant bonding materials were evaluated using a conical-flat plate rotary viscosity meter (manufactured by Toki Sankyo KK) to obtain a Casson plot. Moreover, hysteresis was measured, and an infinite hysteresis area (A−B)/(A+B) was calculated according to JIS R1665.

TABLE 1

| Bonding material No. | Layered clay mineral [mass %] | Organic binder [mass %] |
|---|---|---|
| A | 2.0 | 3.0 |
| B | 0.6 | 0.2 |
| C | 0.3 | 4.0 |
| D | 0.1 | 0.1 |
| E | 0.0 | 3.0 |
| F | 0.0 | 0.0 |

3. Bonding of Honeycomb Segments and Evaluation Thereon

Subsequently, 16 honeycomb segments were bonded to one another by use of the bonding material shown in Table 1, and dried at 200° C. for 2 hours. Afterward, an outer peripheral portion was ground so as to obtain a cylindrical shape, and the corresponding portion was coated with a coating material and subjected to a thermal treatment at 500° C. for 2 hours, to obtain a honeycomb structure. In this honeycomb structure, 24 bonded portions were visually observed, and the number of the bonded portions having a displacement of 5 mm or more was counted. From a viewpoint of practical use, when the displacement portions are substantially 20% or less (5 portions or less) of the observed portions, the structure is regarded as successful. There are preferably 3 or less displacement portions, and the displacement portions are especially preferably 10% or less (2 portions or less) of the observed portions.

Moreover, these honeycomb structures were attached to the exhaust tube of a diesel engine, and 10 g/L of soot was accumulated. Afterward, the soot was regenerated so that the center of each honeycomb structure had a temperature of 1300° C. With regard to the tested honeycomb structures, the appearance of bonding layers was observed with an optical microscope, to check the presence of crack. These observation results are shown in Table 2.

TABLE 2

| | Bonding material No. | Casson yield value [Pa] | (A − B)/(A + B) | Displacement [portion] | Bonding layer appearance |
|---|---|---|---|---|---|
| Example 1 | A | 10.2 | 0.15 | 0 | No crack |
| Example 2 | B | 8.5 | 0.05 | 1 | No crack |
| Example 3 | C | 7.3 | 0.01 | 2 | No crack |
| Example 4 | D | 6.2 | 0.10 | 3 | No crack |
| Comparative Example 1 | E | 3.1 | 0.50 | 7 | Cracked |
| Comparative Example 2 | F | 1.5 | 0.10 | 12 | Cracked |

It is seen from Table 2 that the layered clay mineral can be added to suppress a disadvantage that the bonded portions are displaced from a bonding time to a time when a bonding strength is developed and that the durability of the honeycomb structure is improved.

Moreover, it is seen from Table 2 that the amount of the layered clay mineral to be contained in the bonding material is preferably 0.3 mass % or more. It is seen that the amount is especially preferably 0.6 mass % or more. Furthermore, when the amount of the layered clay mineral to be contained in the bonding material is 2 mass %, there is not any defect such as the generation of the crack or the displacement of the bonded portions.

Furthermore, it is seen from Table 2 that the honeycomb structure bonded with the bonding material containing 0.1 mass % or more of the layered clay mineral and 0.1 mass % or more of the organic binder does not have any defect such as the generation of the crack or the displacement of the bonded portions.

In addition, it is seen from Table 2 that any crack is not generated in the honeycomb structure bonded with the bonding material having a Casson yield value of 6.2 Pa or more. As the Casson yield value increases to 7.3 Pa, to 8.5 Pa, and to 10.2 Pa, the portions where the bonded portions are displaced decrease to 2, to 1, and to 0. That is, it is seen that the honeycomb structure bonded with the bonding material having a Casson yield value of 6.0 Pa or more is preferable.

INDUSTRIAL APPLICABILITY

A honeycomb structure and a method for producing the honeycomb structure according to the present invention are preferably usable in a filter or the like for trapping fine particles in an exhaust gas from an internal combustion engine, a boiler or the like.

The invention claimed is:

1. A honeycomb structure comprising a plurality of honeycomb segments and being made of ceramic;
said honeycomb segments being provided with cell structures comprising a plurality of cells constituting fluid channels divided by porous partition walls and porous outer walls on outer peripheries of the cell structures, and having been integrated by bonding the outer walls of the respective honeycomb segments to one another with a bonding material,
wherein
the bonding material contains 0.1 to 10 mass % of a layered clay mineral,
the bonding material contains 0.1 to 10 mass % of an organic binder,
the bonding material has a Casson yield value of 6 Pa or more, and
the layered clay mineral is selected from the group consisting of montmorillonite, beidellite, nontronite, hectonite and vermiculite.

2. The honeycomb structure according to claim 1, wherein the bonding material has a dimensionless hysteresis area (A−B)/(A+B) of 0.01 to 0.3, in which A is an area in a raising process, and B is an area in a lowering process, in a case where a shear speed is raised and lowered in a stepwise manner.

3. The honeycomb structure according to claim 1, wherein the bonding material has a contraction ratio of 3% or less, when the bonding material is left at room temperature.

4. The honeycomb structure according to claim 1, wherein the bonding material contains one selected from the group consisting of an inorganic binder, a ceramic aggregate and a ceramic fiber.

5. The honeycomb structure according to claim 1, wherein the organic binder is selected from the group consisting of carboxymethyl cellulose, methyl cellulose, hydroxypropyl methyl cellulose, and polyvinyl alcohol.

6. A method for producing a honeycomb structure made of a ceramics, comprising a bonding step of integrating a plurality of honeycomb segments, by bonding the outer walls of the respective honeycomb segments to one another with a bonding material;
said honeycomb segments being provided with cell structures comprising a plurality of cells constituting fluid channels divided by porous partition walls and porous outer walls on outer peripheries of the cell structures,
wherein a load is applied to the honeycomb segments to bond the outer walls by use of the bonding material containing 0.1 to 10 mass % of a layered clay mineral the bonding material contains 0.1- to 10 mass % of an organic binder, the bonding material has a Casson yield value of 6 Pa or more, and the layered clay mineral is selected from the group consisting of montmorillonite, beidellite, nontronite, hectonite and vermiculite.

7. The method for producing the honeycomb structure according to claim 6, wherein the bonding material has a dimensionless hysteresis area (A−B)/(A+B) of 0.01 to 0.3, in which A is an area in a raising process, and B is an area in a lowering process, in a case where a shear speed is raised and lowered in a stepwise manner.

8. The method for producing the honeycomb structure according to claim 6, wherein the bonding material has a contraction ratio of 3% or less, when the bonding material is left to stand at room temperature.

9. The method for producing the honeycomb structure according to claim 6, wherein the bonding material contains one selected from the group consisting of an inorganic binder, a ceramic aggregate and a ceramic fiber.

10. The method for producing the honeycomb structure according to claim 6, wherein the outer walls of the respective honeycomb segments are bonded while being applied with vibration.

11. The method for producing the honeycomb structure according to claim 6, wherein the honeycomb segments are bonded by giving a pressure to the outermost peripheral layer of the stacked honeycomb segments.

12. The method for producing the honeycomb structure according to claim 6, wherein a gap between the honeycomb segments is filled with the bonding material.

* * * * *